Dec. 9, 1952   V. J. VICKERS ET AL   2,621,223
DYNAMOELECTRIC MACHINE
Filed July 18, 1951   2 SHEETS—SHEET 2
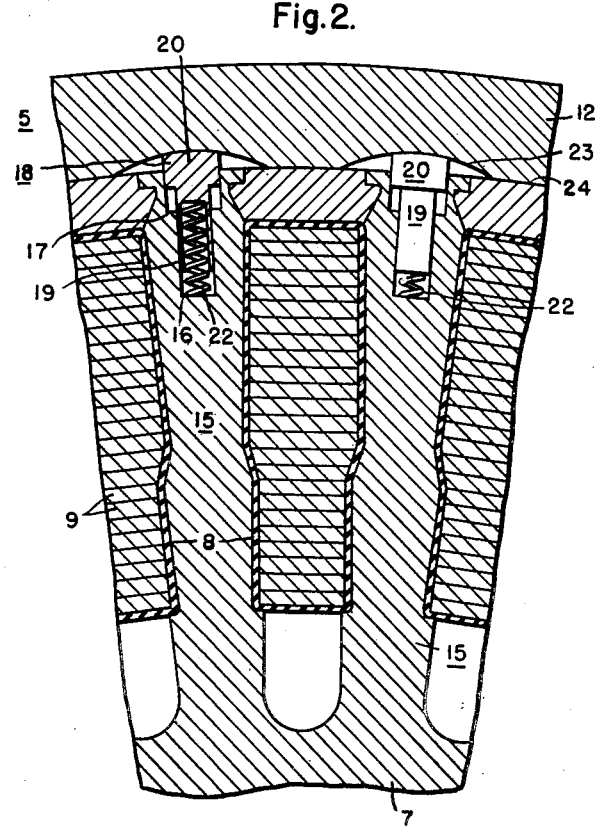
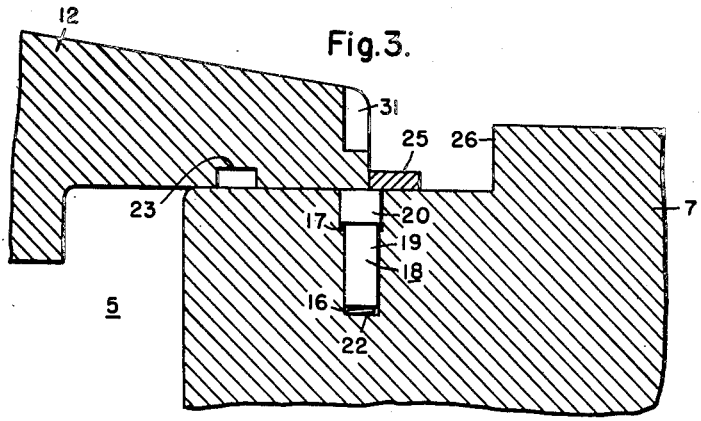
WITNESSES:
INVENTORS
Valentine J. Vickers
and Harry Willis.
BY O. B. Buchanan
ATTORNEY Patented Dec. 9, 1952

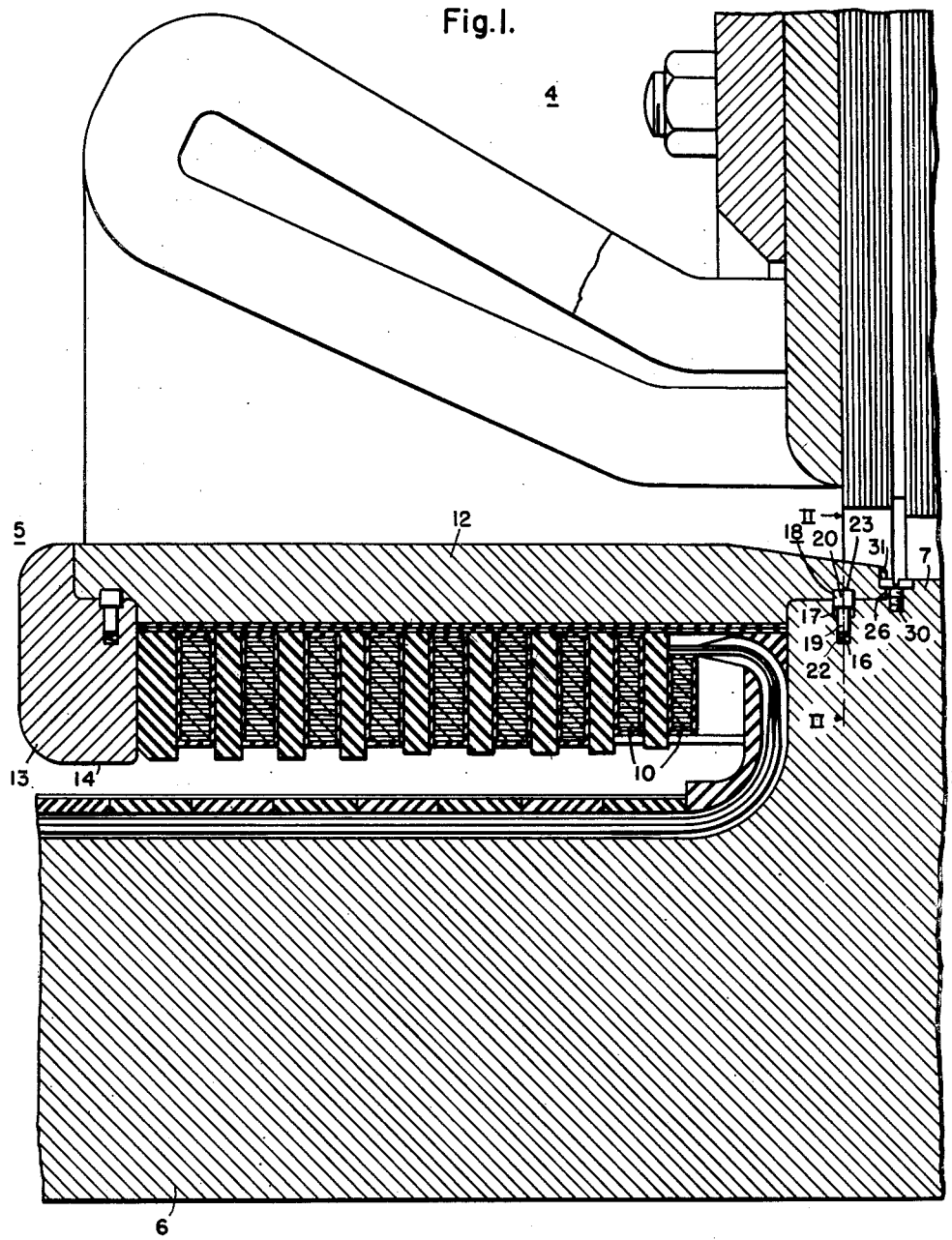

2,621,223

UNITED STATES PATENT OFFICE 2,621,223

DYNAMOELECTRIC MACHINE

Valentine John Vickers and Harry Willis, Stafford, England, assignors to The English Electric Company Limited, London, England, a British company Application July 18, 1951, Serial No. 237,314
In Great Britain November 14, 1950

4 Claims. (Cl. 171—206)

Our invention relates to the rotor-members of high-speed dynamo-electric machines, and it has particular relation to steam-turbine alternators having a slotted cylindrical-core rotor-member, that is, a non-salient-pole rotor-member, which carries the field-winding of the machine, usually a two-pole field, carried by the rotor-slots. Our invention has particular relation to the fastening-means for securing the retaining rings which surround the end turns of the rotor-winding.

The particular novel feature of our present invention resides in the provision of retaining-ring fastening-means which can be released by a small rotating-movement of the retaining ring, so that the retaining ring can then be removed.

With the foregoing and other objects in view, our invention consists in the combinations, systems, parts, structures, and methods of design and operation, hereinafter described and claimed, and illustrated in the accompanying drawing, wherein Figure 1 is a longitudinal sectional view of a small portion of one end of a dynamo-electric machine embodying our invention, Fig. 2 is a larger-scale fragmentary transverse section through the retaining ring and a small part of the rotor, on the line II—II of Figure 1, and Fig. 3 is a fragmentary longitudinal sectional view illustrating the method of initially assembling the retaining ring on the rotor member.

In Fig. 1, we have illustrated our invention as being applied to a two-pole rotating-field alternator, or other dynamo-electric machine, having a stator member 4 and a rotor member 5. Only a portion of the top half of one end of the machine is shown in Figure 1, with the understanding that the bottom half will be similar, and that the other end of the machine will be similar to the illustrated end.

The rotor member 5 is illustrated as comprising a shaft 6, which merges integrally into a larger-diameter rotor-core portion, or rotor-member proper, which is designated by the numeral 7. As shown in Fig. 2, the rotor member 7 is slotted, as at 8, to receive the rotor winding 9, which has end turns 10, at each end of the machine, as shown in Figure 1. The end turns 10 at each end of the rotor are retained by means of a separate retaining ring 12, having its inner end fitting tightly over the end of the rotor member 7, and having its outer end fitting tightly over a floating end plate 13 which preferably has a bore 14 which is free of contact with the shaft 6.

The retaining ring is invariably shrunk-fit over its respective cylindrical fitting-members, at the respective ends of the retaining ring, that is, over the end of the rotor member 7, and also over the end plate 13. In shrinking the retaining ring in place, it is first heated to a temperature of 200° C., or such other temperature as can be withstood by the winding-insulation, so as to expand the retaining ring enough so that it can be slipped over the cylindrical fitting-member, as will be more particularly described hereinafter in connection with the novel distinguishing features of our invention.

The retaining ring may be made of magnetic steel, or of non-magnetic steel, or of other strong material. In either case, special attention has to be given to the mechanical strength of the retaining ring, so as to be able to withstand the large centrifugal forces to which it is subjected, as any breakage or loosening of the retaining ring will result in serious trouble, and hazard to personnel and property, by reason of the flying out of parts of the swiftly rotating rotor member 5. Our invention is particularly applicable to large machines, where the problem of centrifugal forces is acute.

In some machines, it is considered desirable to use a non-magnetic steel for the retaining ring 12, and this introduces particularly severe problems, because the kind of non-magnetic steel which has to be used has a much higher thermal coefficient of expansion than magnetic steel, thus having a tendency to loosen the retaining ring when the machine gets hot, or to subject the retaining ring, when cold, to such a tight-fitting shrunk-on pressure as to permanently expand the ring, so that it may not fit tightly enough the next time it is heated when the machine is in use. The non-magnetic steel which is used for the retaining ring (when such material is used) is also considerably weaker than magnetic steel, and it is much more difficult to drill small holes therein, particularly tapped holes (not shown), such as have been used before, in connection with the old type of retaining-ring fastening-means which is shown, but not described, in a Hill et al. Patent 2,319,074, granted May 4, 1943.

This old type of fastening-means involved the use of matching annular grooves in both the retaining ring and the cylindrical fitting-member, as shown in the Hill et al. patent, and these grooves were keyed together by an outwardly expanding spring-ring which would key the two parts together when the ring was expanded, but the ring could be pushed inwardly, so as to unlock the parts, by drilling and tapping a plurality of small radial holes in the retaining ring, around the periphery of the resilient keying-ring. The retaining ring could then be heated to expand the same sufficiently to loosen its fit, after which it could be withdrawn by pulling it longitudinally off of the cylindrical fitting-member on which it was shrunk. Our invention is more particularly applicable to the fastening of non-magnetic retaining rings 12, wherein the retaining-problems are much more acute, as has just been explained.

Our novel retaining-ring fastening-means may be used at either or both ends of the retaining ring 12, that is, either at the place where it fits over the end of the rotor member 7, or at the place where it fits over the end plate 13. In Fig. 1, our new kind of fastening-means is shown at both ends of the retaining ring 12, but since both ends may be similar, the description will be directed more particularly to the inner end of the retaining ring 12, where it fits over the end of the rotor member 7.

As shown in Fig. 2, the rotor-teeth 15, which are disposed between the rotor winding-receiving slots 8, are each provided with a radially drilled hole 16, which is drilled inwardly from the periphery of the rotor. All of these holes 16 are disposed in a single plane which is transverse, or at right angles, to the axis of the rotor member. The top of each hole 16 is circumferentially enlarged, on each side, to provide a short arcuate top-slot 17, which has to be short, because the circumferential widths of the teeth are limited. Each arcuate slot 17, with its centrally disposed hole 16, receives a spring-biased plunger or locking-member 18, which has a shank 19 which slides radially in the hole 16, and a head 20 which slides radially in the arcuate top-slot 17. In the bottom of the hole 16 is disposed a spring 22 which tends to force the plunger or locking-member 18 outwardly. The depth of the arcuate top-slot 17 is sufficient so that the entire head 20 of the plunger can be pressed down into said slot, so as to be flush with the outer periphery of the rotor member at this point.

As is also shown in Fig. 2, the corresponding end of the retaining ring 12 is provided with a plurality of plunger-receiving grooves 23, each groove receiving one of the spring-biased plungers 18, and each groove merging circumferentially into an intermediate ungrooved portion 24, between two adjacent grooves 23, so that the bore of the retaining ring is not grooved or cut back at these intermediate ungrooved portions 24.

In operation, as shown in Fig. 3, when the machine is being assembled, and when the retaining ring 12 is ready to be moved longitudinally into place on the end of the rotor member 7, the spring-biased plungers 18 must first all be temporarily held down or depressed, so that the heated retaining ring 12 can be shoved into place. For this purpose, we prefer to use an expedient which has previously been used with the spring keying-ring in the type of fastening-means which was shown in the Hill et al. patent: namely, a temporary band 25 is applied around the rotor member 7, over the back halves of the plungers 18, so as to press said plungers down, and to hold them so, until after the heated retaining ring 12 has been thrust far enough into place so that it covers (and holds down) the front halves of the plungers 18, after which the temporary band 25 can be removed and the retaining ring 12 can be thrust the rest of the way into place on that end of the rotor member 7.

It has been common practice to reduce the diameter of the rotor member 7 at the place over which the inner end of the retaining ring 12 is to be fitted, thus providing the rotor member with a shoulder 26 which limits the inward longitudinal or axial movement of the retaining ring 12, as it is being thrust into place. In our case, this centers the keying or locking grooves 23 of the retaining ring 12, over the plunger-heads 20, so that these heads are locked or keyed into place, by being thrust outwardly, by their springs 22, so that each head 20 lies partly within its retaining-ring groove 23, and partly within its rotor-member slot 17. After the parts have thus fallen into place, and while the retaining ring 12 is still hot, it is desirable, as has formerly been the practice with other types of fastening-means, to draw back the retaining ring 12 for a very small fraction of an inch, in a longitudinal or axial direction, so as to draw the inner end of the retaining ring 12 back a trifle from the rotor-member shoulder 26, as far as will be permitted by the keying action of the plunger-heads 20, thus taking up the slight amount of backlash or loose play which is necessary in order to permit the plungers 18 to be freely movable within their slots and grooves 17 and 23.

The foregoing assembly-operations do not present any particular difficulty, either in our present invention, or in the type of fastening-means which have previously been used for holding the retaining rings 12 in place on the rotor-members of dynamo-electric machines. The problem arises, in getting the retaining ring 12 off again, after the machine has been in use, if it becomes necessary to repair the rotor-windings 9.

The removal of the retaining ring 12, in accordance with our invention, is very simple. The retaining ring is first heated, to expand it enough to loosen its fit on the rotor member 7, and then it is simply rotated a very slight amount, to a point where the rotor-member plungers 18 are engaged by the ungrooved portions 24 of the retaining ring 12, thereby depressing said plungers against their spring-bias, until they are flush with the peripheral surface of that portion of the rotor member, after which the retaining ring 12 can be withdrawn in an axial direction, off of the rotor member 7. Sometimes, before attempting to press in the interlocking members or plungers 18, it may be desirable, as has heretofore been done with the spring-ring type of interlocking member, to first press the retaining ring 12 axially inwardly, tightly up against the rotor-member shoulder 26, so as to free the interlocking-members 18 from being bound against the sides of their slots and grooves 17 and 23, and then the retaining ring 12 can be more easily slightly rotated, after which the retaining ring can be drawn axially off of the rotor member, as just described.

While we have described the spring-biased interlocking-members 18 as being in the form of discrete spring-biased plungers, as shown in the drawing, we do not wish to exclude other possibilities; the real essential being, so far as the broader aspects of our invention are concerned, that the spring-biased locking-means, whatever it is, shall have a plurality of discrete outwardly projecting protuberances, like the tops of the plunger-heads 20, which fit into the retaining-ring grooves 23, and which can be depressed by the intermediate ungrooved portions 14 of the retaining ring upon a slight rotation of the retaining ring.

If desired, the retaining ring, once assembled, can be locked into place, against any possibility of accidental rotation in case the retaining ring should become very hot and loose at high speeds or overspeeds. To this end, we have shown a locking screw 30 in Figure 1, which may be used to fit into a lateral notch 31 in the retaining ring 12, said locking screw 30 being threaded into the rotor member 7.

The foregoing and other changes and modifications are contemplated as being well within the scope of our invention, as well as other changes by way of the addition of refinements, or the omission or modification of parts, or the substitution of equivalents. We desire, therefore, that the appended claims shall be accorded the broadest construction consistent with their language.

We claim as our invention:

1. A slotted cylindrical-core rotor-member for a high-speed dynamo-electric machine, having a rotor-winding carried by the rotor-slots, a separate retaining ring for the end turns at each end of the rotor-winding, and fastening-means for at least one end of each retaining ring, said fastening-means including a cylindrical fitting-member over which the retaining ring has a tight fit, said cylindrical fitting-member having radially spring-biased locking-means having outwardly extending radial protuberances at a plurality of circumferentially spaced points all around said cylindrical fitting-member in a plane transverse to the axis of said cylindrical fitting-member, and each retaining ring having a plurality of protuberance-receiving grooves which merge circumferentially into intermediate ungrooved portions, whereby said protuberances can be depressed against their spring-bias, by rotating the retaining ring to a point where said protuberances are engaged by said ungrooved portions.

2. A slotted cylindrical-core rotor-member for a high-speed dynamo-electric machine, having a rotor-winding carried by the rotor-slots, a separate retaining ring for the end turns at each end of the rotor-winding, and fastening-means for at least one end of each retaining ring, said fastening-means including a cylindrical fitting-member over which the retaining ring has a tight fit, said cylindrical fitting-member having a plurality of discrete radially spring-biased locking-members at a plurality of circumferentially spaced points all around said cylindrical fitting-member in a plane transverse to the axis of said cylindrical fitting-member, and each retaining ring having a plurality of locking-member-receiving grooves which merge circumferentially into intermediate ungrooved portions, whereby said locking-members can be depressed against their spring bias, by rotating the retaining ring to a point where said locking-members are engaged by said ungrooved portions.

3. A slotted cylindrical-core rotor-member for a high-speed dynamo-electric machine, having a rotor-winding carried by the rotor-slots, a separate retaining ring for the end turns at each end of the rotor-winding, each retaining ring having a tight fit over its ends of the slotted rotor-member, and fastening-means for the fitting end of each retaining ring, said fastening-means including radially spring-biased locking-means having outwardly extending radial protuberances at a plurality of circumferentially spaced points all around the rotor-member in a plane transverse to the axis of said rotor-member, and each retaining ring having a plurality of protuberance-receiving grooves which merge circumferentially into intermediate ungrooved portions, whereby said protuberances can be depressed against their spring-bias, by rotating the retaining ring to a point where said protuberances are engaged by said ungrooved portions.

4. A slotted cylindrical-core rotor-member for a high-speed dynamo-electric machine, having a rotor-winding carried by the rotor-slots, a separate retaining ring for the end turns at each end of the rotor-winding, each retaining ring having a tight fit over its end of the slotted rotor-member, and fastening-means for the fitting end of each retaining ring, said fastening-means including a plurality of discrete radially spring-biased locking-members at a plurality of circumferentially spaced points all around the rotor-member in a plane transverse to the axis of said rotor-member, said circumferentially spaced points including a plurality of rotor-teeth between the rotor-slots, and each retaining ring having a plurality of locking-member-receiving grooves which merge circumferentially into intermediate ungrooved portions, whereby said locking-members can be depressed against their spring bias, by rotating the retaining ring to a point where said locking-members are engaged by said ungrooved portions.

VALENTINE JOHN VICKERS.
HARRY WILLIS.

REFERENCES CITED

The following references are of record in the file of this patent:

UNITED STATES PATENTS

| Number | Name | Date |
|---|---|---|
| 2,449,920 | Williams | Sept. 21, 1948 |

FOREIGN PATENTS

| Number | Country | Date |
|---|---|---|
| 378,920 | Great Britain | Aug. 19, 1932 |